No. 883,274. PATENTED MAR. 31, 1908.
A. J. BAILEY.
DEVICE FOR CARRYING SPARE WHEELS OR TIRES ON MOTOR CARS.
APPLICATION FILED MAY 28, 1907.
4 SHEETS—SHEET 1.
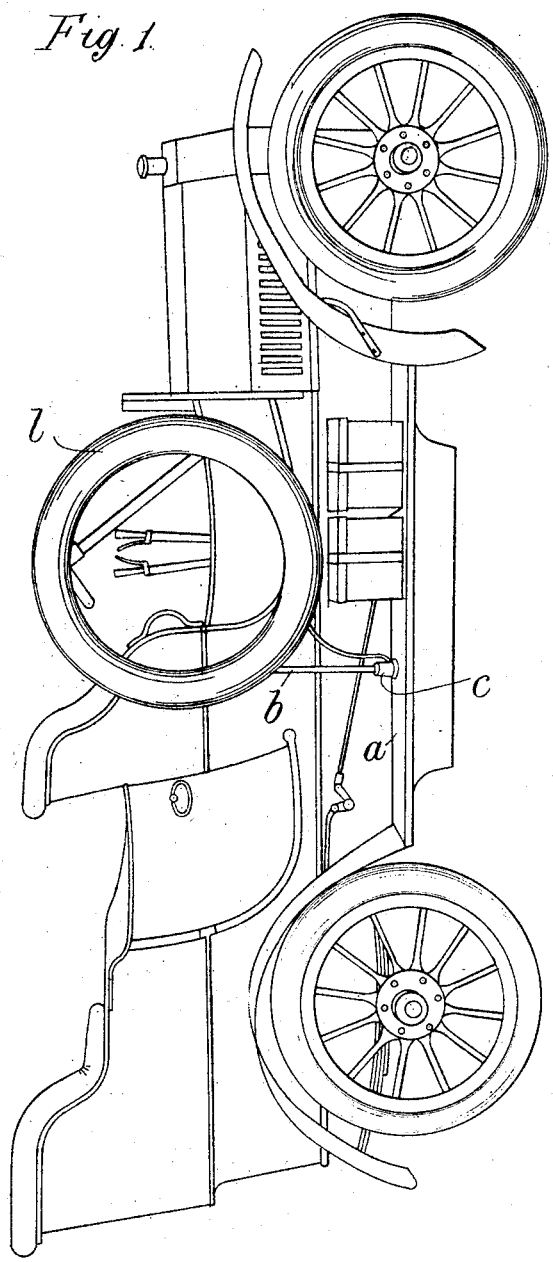
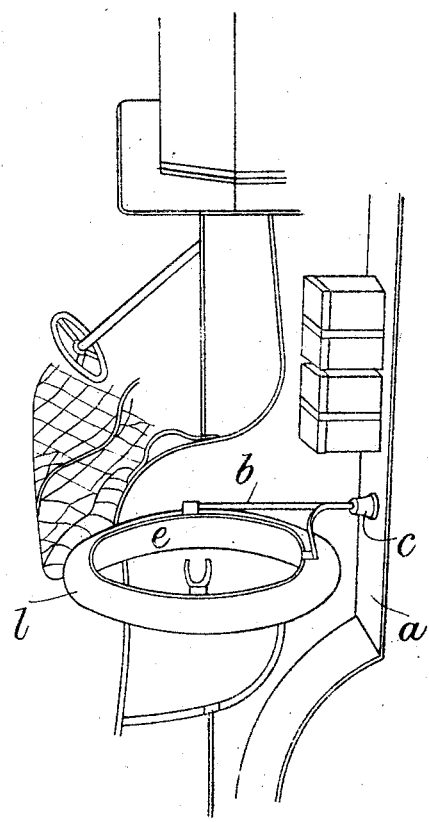

No. 883,274. PATENTED MAR. 31, 1908.
A. J. BAILEY.
DEVICE FOR CARRYING SPARE WHEELS OR TIRES ON MOTOR CARS.
APPLICATION FILED MAY 28, 1907.
4 SHEETS—SHEET 2.
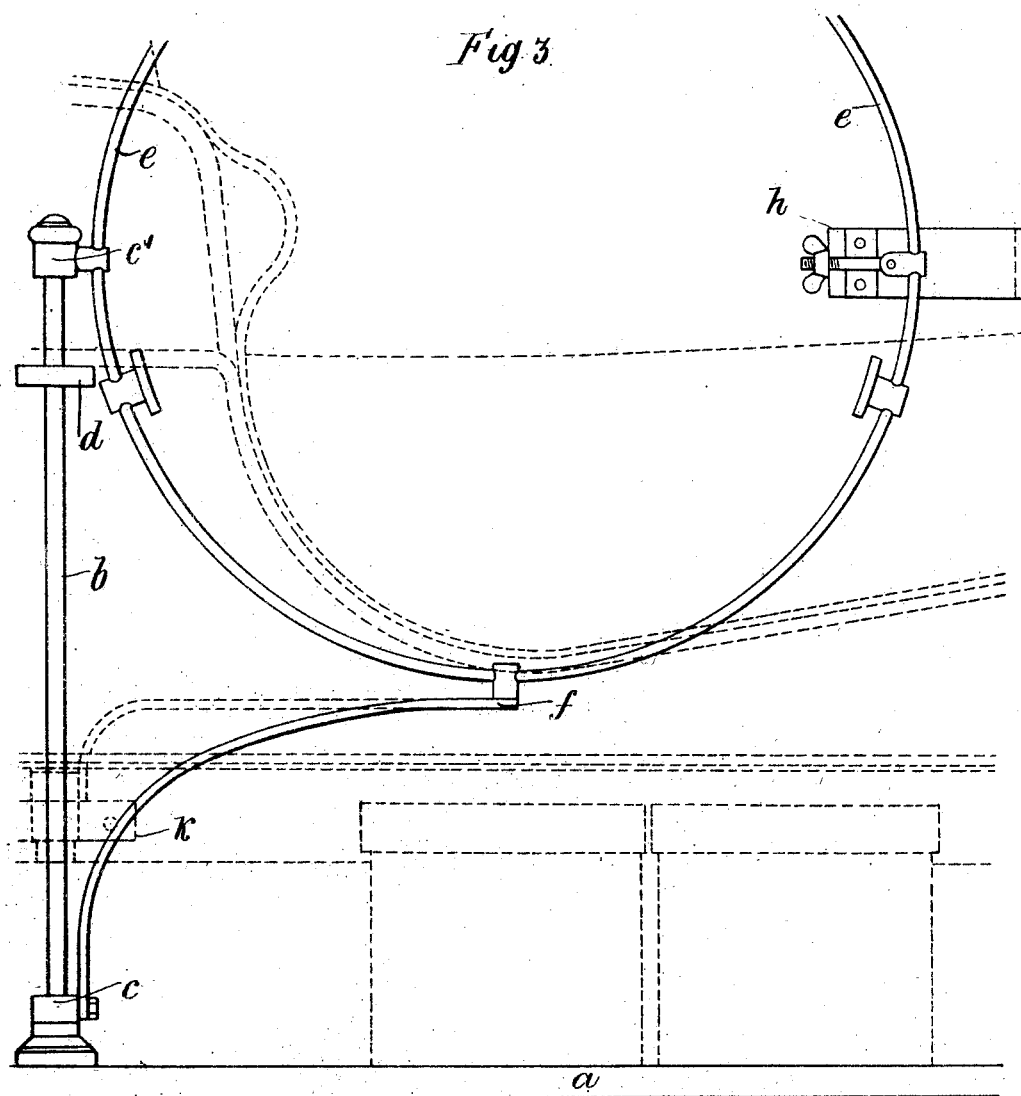
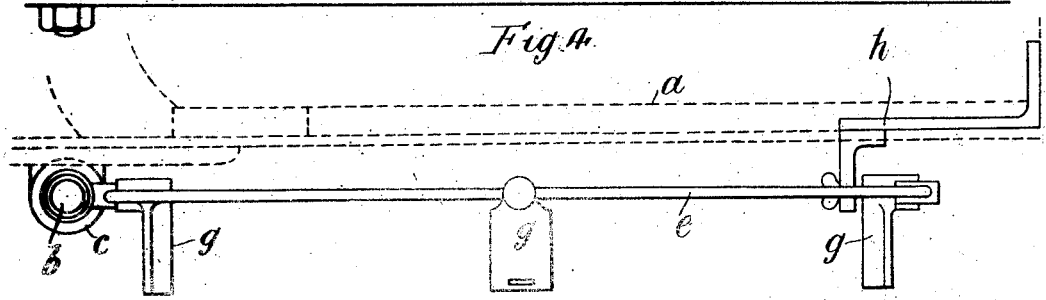
WITNESSES
INVENTOR
Alfred John Bailey

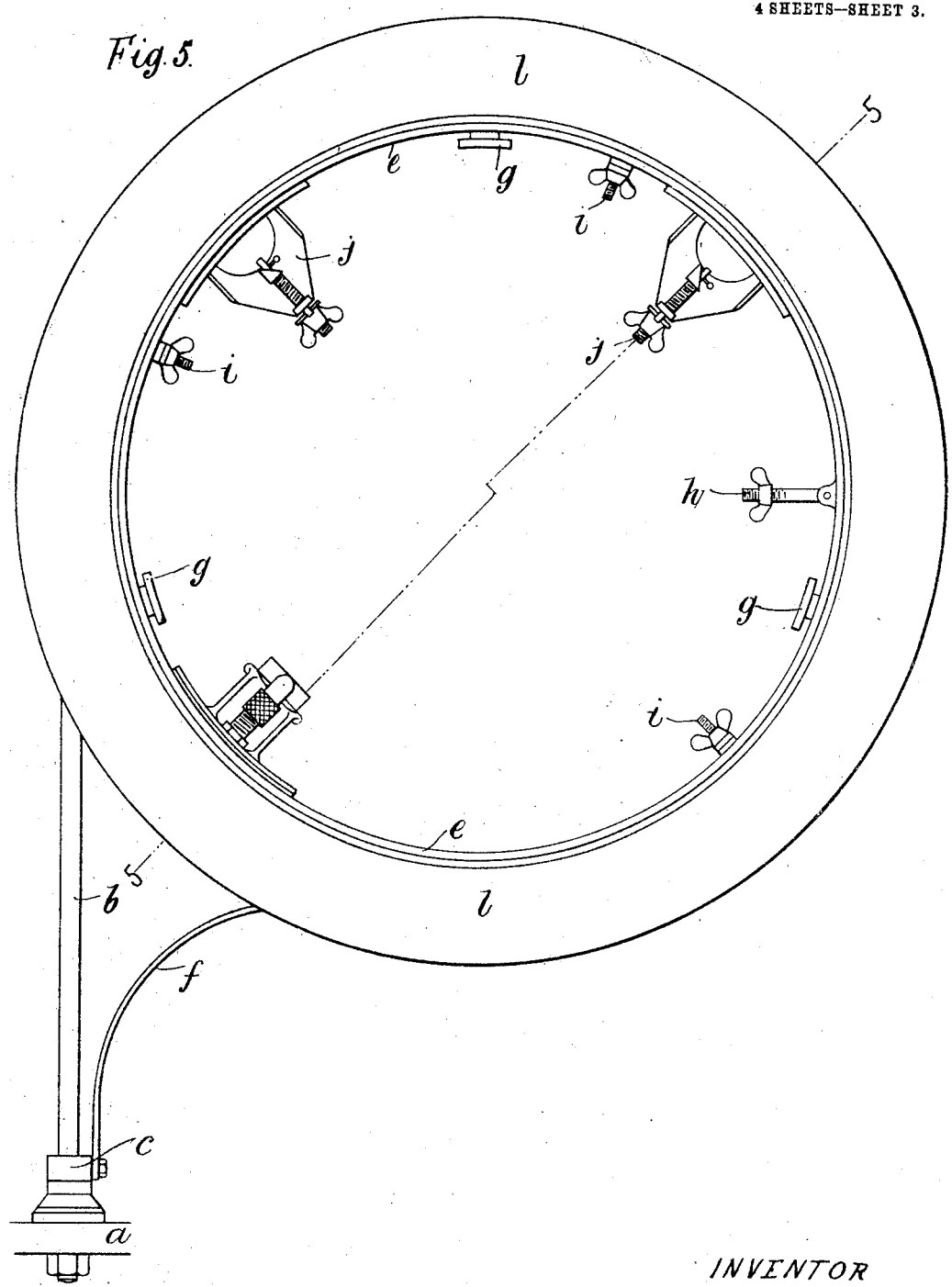

No. 883,274. PATENTED MAR. 31, 1908.
A. J. BAILEY.
DEVICE FOR CARRYING SPARE WHEELS OR TIRES ON MOTOR CARS.
APPLICATION FILED MAY 28, 1907.

4 SHEETS—SHEET 4.

WITNESSES

INVENTOR
Alfred John Bailey

UNITED STATES PATENT OFFICE.

ALFRED JOHN BAILEY, OF SALFORD, ENGLAND.

DEVICE FOR CARRYING SPARE WHEELS OR TIRES ON MOTOR-CARS.

No. 883,274.   Specification of Letters Patent.   Patented March 31, 1908.

Application filed May 28, 1907. Serial No. 376,180.

*To all whom it may concern:*

Be it known that I, ALFRED JOHN BAILEY, a subject of the King of Great Britain, residing at Albion Works, Salford, in the county of Lancaster, England, have invented an Improved Device for Carrying Spare Wheels or Tires on Motor-Cars, of which the following is a specification.

My invention relates to an improved device for carrying a spare wheel, or rim and tire, or tire only on a motor car.

This device consists of a ring or carrier frame with clips or equivalents designed to hold the spare wheel or tire and mounted to swivel upon a vertical axis fixed upon either side or at the back or front of the car. By this arrangement the complete spare wheel or rim and tire, or tire only, is securely held ready for use if required and can be swung back on the vertical axis of the holder out of the way when entering or leaving the car or while the car is being cleaned or for any other purpose and can then be swung back again and fastened in place.

Figure 6:
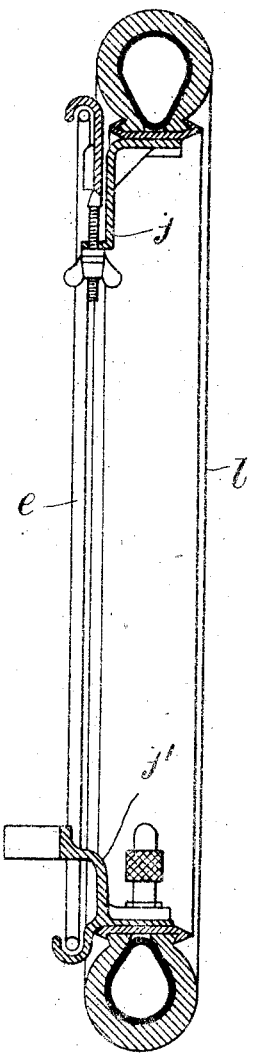

In the accompanying four sheets of drawings—Figure 1 represents a side elevation of a motor car to which my improved device is applied. Fig. 2 is a side elevation of part of Fig. 1 with the improved device in a different position. Figs. 3, 4, and 5 are detail views of the improved device on a larger scale, Fig. 3 being a side elevation, Fig. 4 a plan and Fig. 5 a side elevation showing the device carrying a complete spare motor wheel. Fig. 6 is a transverse section on line 5—5 of Fig. 5, omitting the vertical pillar, and Fig. 7 is a similar view but showing a tire only instead of a complete spare wheel.

Figure 7:
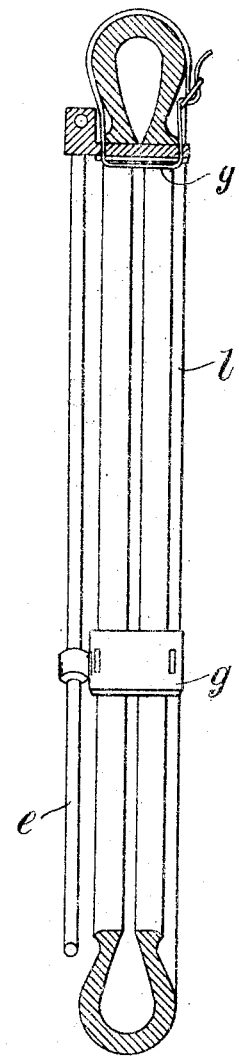

In the drawings,—*a* designates part of the frame of a motor car: *b* a vertical pillar bolted upon the footplate of the car as shown in full and dotted lines; *c, c'* hinges which form bearings for the carrier; *d* a bracket secured to the frame as a stay for the pillar; *e* a ring of metal or other suitable material forming the carrier frame and connected directly to the upper hinge *c'* and to the lower hinge *c* by the bracket *f; g* angle brackets secured to the carrier to receive the spare tire see Fig. 7, or a complete wheel without clips of its own; *h* a locking screw for holding the device in the closed position, or in place of the screw *h* a spring latch might be employed; *j* the adjustable clips and *j'* the fixed bracket for locking the spare wheel to the car wheel in the manner well understood by motorists and to the carrier as shown best in Fig. 6.

If desired the vertical pillar *b* might be supported in an additional bracket *k*, secured to the side frame of the car, as shown in dotted lines Fig. 3, and in such case either the footstep support or the bracket *d* or both supports might be dispensed with.

The device carrying a spare wheel such as the Stepney wheel and tire *l* is shown in Fig. 1 in the position it would occupy while the car was running; and in Fig. 2 it is shown opened or swung back to facilitate cleaning the car or for taking off the spare wheel.

I am aware that prior to my present invention it has been proposed to construct a carrier for spare pneumatic or other tires, which is arranged to swing back close to the motor car body when not in use, that is to say when the spare tire is not mounted on the carrier, which in ordinary practice consists of three such arms each swinging or adjustable from a separate point on the car; whereas in my arrangement the clips or equivalents fasten the tire to one ring or carrier which is mounted to swing from a single vertical axis, and it will thus be seen that my invention does not lie in any particular plan for securing a spare wheel or tire to its carrier, but consists in the particular mode herein described and illustrated of connecting and hinging a ring or carrier frame to the car.

What I claim and desire to secure by Letters Patent of the United States is:—

1. In combination with an automobile, a vertical standard mounted thereon, a frame extending laterally from the standard, means for swiveling the frame on the standard, and means for holding a tire to the frame.

2. In combination with an automobile, a vertical standard mounted thereon, a ring shaped frame extending laterally from the standard, means for swiveling the frame to the standard, and means for holding a tire to the frame.

In testimony whereof I have signed my name to this specification in the presence of two subscribing witnesses.

ALFRED JOHN BAILEY.

Witnesses:
 HENRY BERNOULLI BARLOW,
 HERBERT ROWLAND ABBEY.